United States Patent
Burgess et al.

(10) Patent No.: US 11,939,996 B2
(45) Date of Patent: Mar. 26, 2024

(54) LOCKING SYSTEMS

(71) Applicant: Goodrich Actuation Systems Limited, Solihull (GB)

(72) Inventors: Graham James Burgess, Telford (GB); Paul Smith, Broseley (GB)

(73) Assignee: GOODRICH ACTUATION SYSTEMS LIMITED, Solihull (GB)

(*) Notice: Subject to any disclaimer, the term of this patent is extended or adjusted under 35 U.S.C. 154(b) by 551 days.

(21) Appl. No.: 17/154,276

(22) Filed: Jan. 21, 2021

(65) Prior Publication Data
US 2021/0231137 A1 Jul. 29, 2021

(30) Foreign Application Priority Data
Jan. 29, 2020 (EP) .................................. 20275018

(51) Int. Cl.
*B64D 15/16* (2006.01)
*B64D 15/20* (2006.01)
*F15B 15/26* (2006.01)

(52) U.S. Cl.
CPC ............ *F15B 15/261* (2013.01); *B64D 15/16* (2013.01); *B64D 15/20* (2013.01)

(58) Field of Classification Search
CPC ........ F15B 15/261; B64D 15/16; B64D 15/20
See application file for complete search history.

(56) References Cited

U.S. PATENT DOCUMENTS

| 5,337,977 | A | 8/1994 | Fleming et al. |
| 6,082,119 | A | 7/2000 | Ellison et al. |
| 6,129,093 | A | 10/2000 | Kelly |
| 2003/0145603 | A1 | 8/2003 | Reed et al. |
| 2012/0032028 | A1* | 2/2012 | Pritzen .................. B64C 1/1407 244/129.5 |
| 2015/0292254 | A1 | 10/2015 | Bessettes et al. |
| 2019/0292817 | A1* | 9/2019 | Tomaszewski ......... E05B 79/20 |

FOREIGN PATENT DOCUMENTS

| FR | 2998921 A1 | 6/2014 |
| WO | 2012077972 A2 | 6/2012 |

OTHER PUBLICATIONS

Extended European Search Report for International Application No. 20275018.8 dated Aug. 7, 2020, 8 pages.

* cited by examiner

*Primary Examiner* — Justin M Benedik
(74) *Attorney, Agent, or Firm* — CANTOR COLBURN LLP

(57) ABSTRACT

A locking system includes a locking element which is movable between a first, locking position and a second unlocking position and an unlocking actuator for moving the locking element (from the first position to the second position over an unlocking stroke length (Su). The system further comprises a control unit configured to command the unlocking actuator to move the locking element from the first position to a third position over an anti-icing stroke length (Sa) which is shorter than the unlocking stroke length (Su).

15 Claims, 1 Drawing Sheet

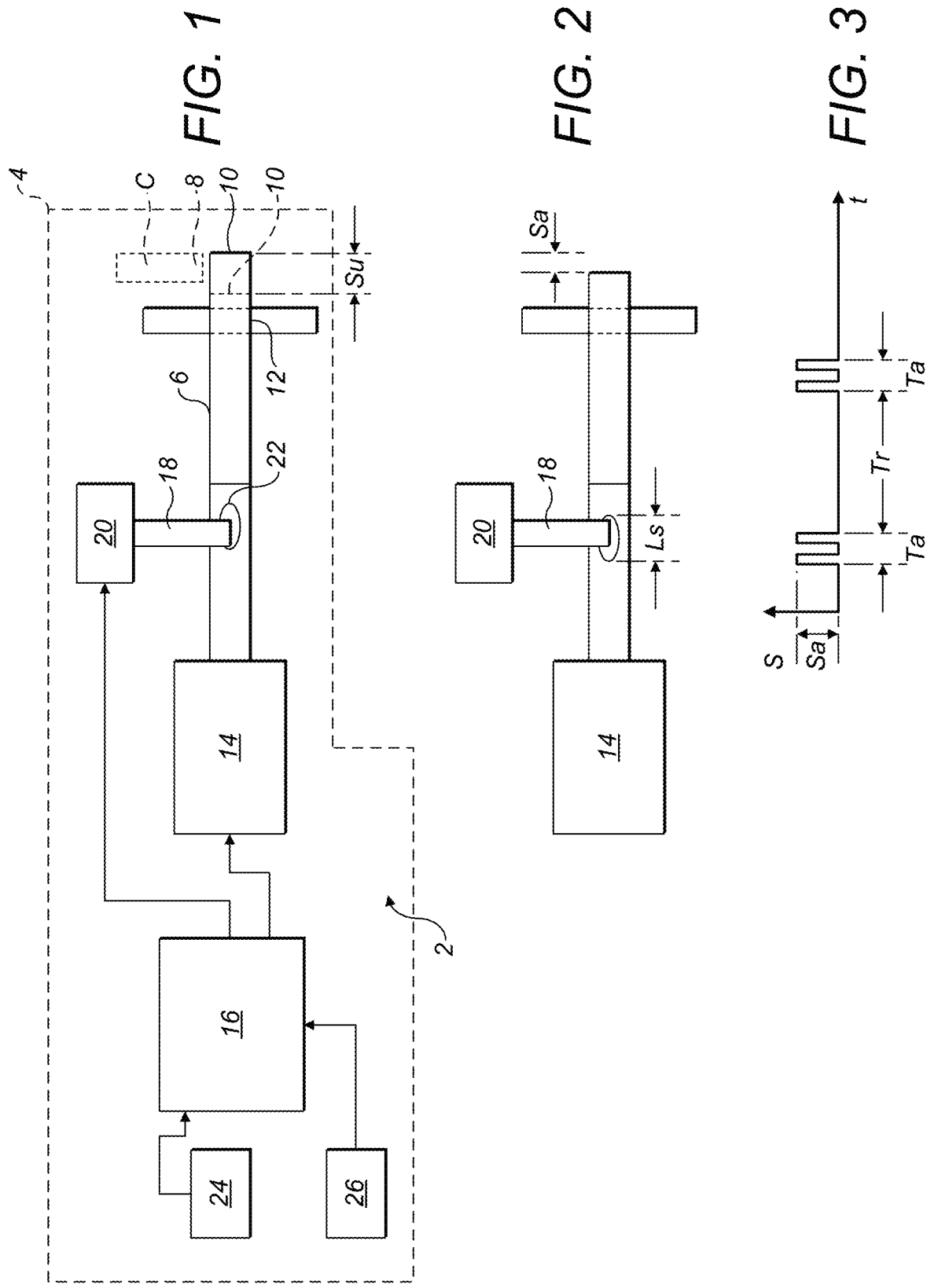

LOCKING SYSTEMS

FOREIGN PRIORITY

This application claims priority to European Patent Application No. 20275018.8 filed Jan. 29, 2020, the entire contents of which is incorporated herein by reference.

TECHNICAL FIELD

The present disclosure to locking systems and in particular to locking systems which are prone to jamming due to icing. Such locking systems may be used in various aircraft systems for example.

BACKGROUND

Aircraft use locking systems to lock components such as wing surfaces, thrust reversers and so on. Typically the locking system comprises a locking element such as a pin which is withdrawn from a detent by an unlocking actuator in order to unlock the component, whereupon the component may be moved by a suitable actuator. In service, however, ice may form on and potentially jam the locking element which means that the unlocking actuators must also be able to shear any ice that has formed. Thus airframe manufacturers typically require an unlocking actuator to provide an unlocking force which is much larger than that needed to unlock the locking element in the absence of ice. In some cases, the force specified may be as high as fifteen times that required to unlock an un-iced locking element. This means that the unlocking actuator must be designed with a larger pressure requirement (for hydraulic actuators) or with a larger current requirement (for electric actuators). This leads to unlocking actuators with increased size and therefore weight which is particularly disadvantageous in an aircraft.

SUMMARY

From a first aspect, the disclosure provides a locking system which comprises a locking element which is movable between a first, locking position and a second unlocking position and an unlocking actuator for moving the locking element from the first position to the second position over an unlocking stroke length. The locking system also comprises a control unit which is configured to command the unlocking actuator to move the locking element from the first position to a third position over an anti-icing stroke length which is shorter than the unlocking stroke length.

The disclosure also provides a control unit for use in a locking system comprising a locking element which is movable between a first, locking position and a second unlocking position, and an unlocking actuator for moving the locking element from the first position to the second position over an unlocking stroke length. The control unit is configured to command the unlocking actuator to move the locking element from the first position to a third position over an anti-icing stroke length which is shorter than the unlocking stroke length.

In embodiments of either of the above, the control unit may be configured to command the unlocking actuator to reciprocate the locking element between the first and third positions.

In embodiments of any of the above, the control unit may be configured to command the unlocking actuator to move or reciprocate the locking element from the first position to the third position intermittently.

In embodiments of any of the above, the unlocking actuator may be a linear actuator and the locking element may move in a linear direction. In alternative embodiments, the locking element and/or the unlocking actuator may move in a rotary motion.

In embodiments of any of the above, the locking element may comprise a pin.

In embodiments of any of the above, the locking system may further comprise a release element engageable with the locking element to prevent movement of the locking element from the first position to the second position. The release element may be solenoid operated.

The locking element may comprise a slot for receiving the release element. The slot may have a length which is greater than or equal to the anti-icing stroke length whereby the release element remains engaged with the locking element during the movement of the locking element between the first and third positions.

In embodiments of any of the above, the control system may be configured to receive data, for example temperature data, indicative of potential icing and to command the unlocking actuator to effect an anti-icing movement of the locking element in response to the received data.

The disclosure also provides an aircraft system comprising a lockable component and a locking system in accordance with the disclosure for locking and unlocking the component.

The disclosure also provides a method of preventing or reducing ice formation in a locking system comprising a locking element which is movable between a first, locking position and a second unlocking position over an unlocking stroke length. The method comprises move the locking element from the first position to a third position over an anti-icing stroke length which is shorter than the unlocking stroke length.

The method may comprise reciprocating the locking element between the first position and the third position.

In embodiments, the method may comprise moving or reciprocating the locking element from the first position to the third position intermittently.

In embodiments of any of the above, the method may comprise moving the locking element from its first position and its third position in response to a parameter indicative of possible icing.

In embodiments of the above, the locking element may be installed on an aircraft, and the temperature is an outside air temperature or static air temperature.

BRIEF DESCRIPTION OF DRAWINGS

An embodiment of the disclosure will now be described by way of example only with reference to the accompanying drawings in which:

FIG. 1 illustrates, schematically, a locking system in accordance with the disclosure in a first position;

FIG. 2 illustrates the locking system of FIG. 1 in a second position; and

FIG. 3 illustrates schematically a sequence of operation of the locking system.

DETAILED DESCRIPTION

With reference to FIG. 1, a locking system 2 is illustrated. The locking system 2 is shown schematically as installed in an aircraft 4, although the system may be used in any context.

The locking system 2 comprises a locking element 6 which is movable in a reciprocating manner between a first, locking position in which it engages with a detent 8 provided in a component C which is to be latched in a desired position, and a second, unlocking position in which it disengages from the detent 8 so as to unlatch the component C, whereupon the component C may be moved, for example by an actuator not shown. In FIG. 1 the position of the end 10 of the locking element 6 in the locking position is shown in solid lines while the position of the end 10 of the locking element 6 in the unlocking position is shown in dotted lines. In the context of an aircraft, the component may be a wing part, a thrust reverser door, an access panel, for example. This list is of course not exhaustive.

The locking element 6 in this embodiment is in the form of a pin which moves in a linear manner between its first and second positions. Other forms of locking element 6 may be used, for example a pivotally mounted locking element. In this embodiment, the locking element 6 is guided in its linear movement by a bushing 12.

The locking element 6 is movable between its first and second positions by means of an unlocking actuator 14. The unlocking actuator 14 moves the locking element 6 from the first position to the second position over an unlocking stroke length Su, illustrated schematically in FIG. 1. The unlocking stroke length Su will be dependent on the application. A typical value may be over 200 mm. In this embodiment the unlocking actuator 14 is a linear actuator for producing a linear movement of the locking element 6. The particular form of unlocking actuator 14 used will depend upon the nature of the movement required by the locking element 6. The unlocking actuator 14 may be a hydraulic actuator, a pneumatic actuator or an electrical actuator for example.

Operation of the unlocking actuator 14 is commanded by a control unit 16, as will be described further below. The control unit 16 may be a dedicated unit, or form a part of a larger aircraft control unit.

The locking system 2 further comprises a release element 18 which engages with the locking element 6 and which must be disengaged from the locking element 6 to permit the locking element 6 to move from its first to its second position. The release element 18 may be a pin, and it is operated by means of a release actuator 20, for example a solenoid. The release actuator 20 is also connected by suitable means to the control unit 16. As illustrated schematically, the release element 18 may be received in an axially extending slot 22 formed in the locking element 6.

In normal use, when the component 10 is to be unlocked, the control unit 16 sends a signal to the release actuator 20 to disengage the release element 18 from the slot 22 and to the unlocking actuator 14 to move the locking element 6 from its first position to its second position, thereby unlocking the component 10.

However, as aircraft operate at high altitude where temperatures are extremely low, there is a tendency for ice to form on the locking element 6, and to cause binding between the locking element and relatively static structures such as the detent 8 itself or the bushing 12. Thus the force applied by the unlocking actuator 14 would, in the absence of the system of the disclosure, have to be sufficiently high to shear or break any accumulated ice. This would result in the unlocking actuator 14 being larger and thus heavier than an actuator sufficient just to effect the unlocking movement.

This problem is overcome in embodiments of the disclosure by incorporating anti-icing functionality in the control unit 16.

The control unit 16, in addition to receiving its normal operating inputs 24 for example power inputs and unlocking commands also receives one or more inputs 26 indicative of the likelihood of ice forming on the unlocking element 6. For example, in an aircraft, the inputs 26 may comprise temperature signals, for example signals representative of an outside air temperature or a static air temperature, for example taken from sensors arranged on the aircraft exterior. The system may use temperature measurements taken by existing aircraft sensors, rather than sensors dedicated to the anti-icing system. Other signals may be input to the control unit 16 such as humidity, altitude etc. The control unit 16 will determine whether the inputs 26 indicate that an anti-icing operation is necessary. For example in certain embodiments, this determination may be made solely upon temperature, an anti-icing operation being instigated when the temperature is below a predetermined value.

To effect anti-icing, the control unit 16 commands the unlocking actuator 14 to move the locking element 6 from its first to a third position, illustrated in FIG. 2, over an anti-icing stroke length Sa which is shorter than the unlocking stroke length Su. During this movement the release element 18 remains engaged within the slot 22 of the locking element 6 so as to prevent inadvertent unlocking of the component 10. To allow this, the axial length Ls of the slot 22 is greater than or equal to the stroke length Sa. This relatively short movement of the locking element 6 will act to either inhibit ice formation or break any ice which may have formed at any interface between the locking element 6 and static structure such as the bushing 12 or detent 8 itself before it reaches a thickness which may interfere with the normal operation of the locking element 6.

The length Sa of the anti-icing stroke can be determined empirically. For example in some embodiments, a stroke length of from 0.5 mm to 2 mm may be sufficient. The ratio of the anti-icing stroke length Sa to the unlocking stroke length Su will depend on the particular application. However, in some embodiments, the ratio may be at least one order of magnitude (1:10), or even two orders of magnitude (1:100).

The locking element 6 advantageously reciprocates between the first and third positions during the anti-icing process. The reciprocation may be continuous or intermittent. While a continuous reciprocation would be acceptable, it may be advantageous to effect the anti-icing movement intermittently. This will potentially reduce wear in the actuation and interface elements of the system while still achieving an anti-icing effect.

The anti-icing movement may therefore be effected in intermittent cycles, for example as illustrated in FIG. 3. In this Figure, the anti-icing movement is effected in anti-icing periods Ta, separated by rest periods Tr. Within each anti-icing period Ta, the locking element 6 may reciprocate over a plurality of cycles (for example two as shown), or just once. The length of each anti-icing period Ta may typically be one to three 3 seconds and the rest period typically be two minutes or more. The anti-icing periods Ta and rest periods Tr may stay the same over time, or may vary. For example the rest periods Tr may become shorter with decreasing temperatures. Similarly the number in cycles in each anti-icing period Ta may stay the same or vary over time. The precise anti-icing movement regime will depend on the particular application.

As discussed above, the anti-icing system is of particular use in aircraft, which are particularly prone to icing issues at altitude. However, icing does occur at sea-level as well, so it is advantageous that the system remains operative on the ground to ensure icing does not occur. Should the system be deactivated on the ground, then it is advisable that a lock/unlock cycle is performed prior to take off to ensure that icing has not occurred and the lock jammed. Should icing have occurred, then the aircraft operator will need to de-ice the system prior to take off.

While the embodiment described above illustrates a linear actuator 14 and linear movement of the locking element 6, it will be appreciated that the disclosure also applies to non-linear movement, for example a rotary movement. The actuator 14 may therefore be a rotary actuator or be configured to produce a rotary unlocking movement of a rotary locking element 6. In such embodiments, therefore, the slot 22 in the locking element 6 may be curved rather than straight.

It will also be appreciated that the system described will have applications in fields other than aircraft systems.

From the above description it will be seen that embodiments of the disclosure have the advantage of preventing jamming of locking elements due to icing without having to increase the operating pressure or current, the size and the weight of the unlocking actuator. It also reduces the maximum operating loads experienced in the system, obviating the need to strengthen components to accommodate these loads.

The invention claimed is:

1. A locking system comprising:
   a locking element which is movable between a first, locking position and a second unlocking position;
   an unlocking actuator for moving the locking element (from the first position to the second position over an unlocking stroke length (Su); and
   a control unit configured to command the unlocking actuator to move the locking element from the first position to a third position over an anti-icing stroke length (Sa) which is shorter than the unlocking stroke length (Su).

2. A locking system as claimed in claim 1, wherein the control unit is configured to command the unlocking actuator to reciprocate the locking element between the first and third positions.

3. A locking system as claimed in claim 1, wherein the control unit configured to command the unlocking actuator to move or reciprocate the locking element from the first position to the third position intermittently.

4. A locking system as claimed in claim 1, wherein the unlocking actuator is a linear actuator and the locking element moves in a linear direction.

5. A locking system as claimed in claim 1, wherein the locking element comprises a pin.

6. A locking system as claimed in claim 1, further comprising a solenoid operated release element, engageable with the locking element to prevent movement of the locking element from the first position to the second position.

7. A locking system comprising:
   a locking element which is movable between a first, locking position and a second unlocking position;
   an unlocking actuator for moving the locking element (from the first position to the second position over an unlocking stroke length (Su);
   a control unit configured to command the unlocking actuator to move the locking element from the first position to a third position over an anti-icing stroke length (Sa) which is shorter than the unlocking stroke length (Su); and
   a solenoid operated release element, engageable with the locking element to prevent movement of the locking element from the first position to the second position;
   wherein the locking element comprises a slot for receiving the release element, the slot having a length (Ls) which is greater than or equal to the anti-icing stroke length Sa whereby the release element remains engaged with the locking element during the movement of the locking element between the first and third positions.

8. A locking system as claimed in claim 1, wherein the control system is configured to receive data, for example temperature data, indicative of potential icing and to command the unlocking actuator to effect a anti-icing movement of the locking element in response to the received data.

9. An aircraft system comprising:
   a lockable component (C); and
   a locking system as claimed in claim 1 for locking and unlocking the component (C).

10. A method of preventing or reducing ice formation in a locking system comprising a locking element which is movable between a first, locking position and a second unlocking position over an unlocking stroke length (Su), the method comprising:
    moving the locking element from the first position to a third position over an anti-icing stroke length (Sa) which is shorter than the unlocking stroke length (Su).

11. A method as claimed in claim 10, comprising reciprocating the locking element between the first position and the third position.

12. A method as claimed in claim 10, comprising moving or reciprocating the locking element from the first position to the third position intermittently.

13. A method as claimed in claim 10, comprising moving the locking element from its first position and its third position in response to a parameter indicative of possible icing.

14. A method as claimed in claim 13, wherein the locking element is installed on an aircraft, and the temperature is an outside air temperature or static air temperature.

15. A control unit for use in a locking system comprising a locking element which is movable between a first, locking position and a second unlocking position, and an unlocking actuator for moving the locking element from the first position to the second position over an unlocking stroke length (Su);
    wherein the control unit is configured to command the unlocking actuator to move the locking element from the first position to a third position over an anti-icing stroke length (Sa) which is shorter than the unlocking stroke length (Su).

* * * * *